United States Patent
DeSimone et al.

[19]

[11] Patent Number: 6,138,141
[45] Date of Patent: *Oct. 24, 2000

[54] SERVER TO CLIENT CACHE PROTOCOL FOR IMPROVED WEB PERFORMANCE

[75] Inventors: Antonio DeSimone, Ocean; Sandeep Sibal, Matawan, both of N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/733,486

[22] Filed: Oct. 18, 1996

[51] Int. Cl.$^7$ .................................................. G06F 13/00
[52] U.S. Cl. ........................ 709/203; 709/213; 711/124; 711/130; 711/146; 711/147; 710/203; 710/10
[58] Field of Search ...................... 395/200.33, 200.53, 395/200.43, 200.46; 711/124, 130, 147, 121, 141, 146; 707/10, 203

[56] References Cited

U.S. PATENT DOCUMENTS

| | | | |
|---|---|---|---|
| 4,855,906 | 8/1989 | Burke | 707/10 |
| 5,151,989 | 9/1992 | Johnson et al. | 707/10 |
| 5,265,235 | 11/1993 | Sindhu et al. | 711/120 |
| 5,303,362 | 4/1994 | Butts, Jr. et al. | 711/121 |
| 5,581,704 | 12/1996 | Barbara et al. | 711/141 |
| 5,734,898 | 3/1998 | He | 707/203 |
| 5,787,470 | 7/1998 | DeSimone et al. | 711/124 |
| 5,793,965 | 8/1998 | Vanderbilt et al. | 709/203 |
| 5,835,908 | 11/1998 | Bennett et al. | 707/10 |
| 5,905,492 | 5/1999 | Straub et al. | 345/333 |

FOREIGN PATENT DOCUMENTS

| | | |
|---|---|---|
| 10198634 | 7/1997 | Japan . |
| 11120048 | 10/1997 | Japan . |

*Primary Examiner*—B. James Peikari

[57] ABSTRACT

On the Internet (106), rather than retrieving a frequently requested Web object from its originating server (105) in response to a request from a client terminal (101, 102), the object rather can be retrieved from a cache (103) within the Internet Access Service Provider (IASP) (104), which connects the client terminal to the Internet. What is stored in the cache may, however, not be the most recent version of the object. Distinct from providing the Web object itself, information about changes to the object is provided by the server in response to a cache request that is asynchronous to a request from a client for the object. Such information about changes to an object includes the date and time when the object was last modified, the byte size of the modified object, and information on the type of content of the object. After receiving this information about changes to an object, the cache may then request that a copy of the object be downloaded to it.

15 Claims, 4 Drawing Sheets

SERVER TO CLIENT CACHE PROTOCOL FOR IMPROVED WEB PERFORMANCE

CROSS REFERENCE TO RELATED APPLICATIONS

This application relates to subject matter described in U.S. patent application Ser. No. 08/733,485, now U.S. Pat. No. 5,787,470, filed simultaneously herewith, for Antonio DeSimone, David H. Shur, and Sandeep Sibal, the first and third named inventors therein being co-inventors herein, and assigned to the assignee hereof.

TECHNICAL FIELD

This invention relates to data communications and computer networking, and more particularly, to the transfer of digital information on packet data networks such as the Internet, between caches and servers.

BACKGROUND OF THE INVENTION

In a transaction on the World Wide Web between a client terminal and a Web server in which the client terminal retrieves a Web object from a server connected on the Internet, the client terminal normally accesses the Internet through an Internet Access Service Provider (IASP). Such an object may be one or more pages of textual information, a picture, a sound clip, a video clip, a JAVA applet or other software, any combination of the former, or anything that is capable of being transmitted digitally over the Internet to a client terminal. The term "object" will be used hereinafter to include all of the foregoing. A cache, located within the IASP network, functions as an intermediary in transactions involving the retrieval of such Web objects from servers by a client terminal. In particular, in its simplest form, a cache within the IASP saves a copy of a retrieved object for itself when the object is moved from the server to the requesting client terminal. This caching operation is transparent to the user and, under normal circumstances, does not incur any significant delay due to the copying operation which is performed simultaneously as the object is retrieved from the server and delivered to the client terminal.

Advantageously, the cache within the IASP network can satisfy subsequent requests for those objects that are stored therein, thereby obviating the necessity of retrieving the object from the originating server on the Internet. This reduces the delay as perceived by the user to access the object and further, saves bandwidth on links that connect the IASP network to the Internet. FIG. 1 is a block diagram of a prior art network in which plural client terminals, such as 101 and 102, are connected to a cache 103 within IASP 104. Cache 103, in turn, is connected to a server 105 connected to the Internet 106. By storing a copy of object from server 105 in cache 103 when it is first retrieved by client 101, subsequent requests for that same object by client 101, or any other client connected to IASP 104, such as client 102, can be satisfied directly from cache 103.

The problem of satisfying subsequent requests for an object from the cache, however, is that the copy of the object stored in the cache may differ from the object in the server if the latter has been modified since the initial request for the object was made and the object was copied and stored in the cache. Thus, the copy of the object provided to the requesting client from the cache may not be current and may be a stale or outdated version of the object as it currently exists in the server from which it originated.

A prior art attempt at tackling the problem of cache staleness uses a "conditional GET" method. Unlike a standard "GET" method in which an object is retrieved from the server upon each and every request by a client, in the "conditional GET" method, a decision is made to retrieve or not to retrieve an object based on the staleness of the object in the cache, i.e., the length of time that the copy of the object has been in the cache since the object was last verified. Unlike the standard "GET" method, the "conditional GET" method includes an "If-Modified-Since" field in the request, which is typically added to the client terminal's request by the cache, before the request is issued from the cache to the server. The "If-Modified-Since" field carries the date of the modification time of the copy of the object in the cache (the modification time being sent to the cache by the server as a field in the header along with the copy of the object itself, on the first response), and the server responds with either a "Not Modified" message if the object the cache carries is current; or the entire new version of the object if the object the cache carries is stale. Advantageously, if the copy of the object in the cache is not stale, the "conditional GET" method prevents wasteful consumption of resources. However, while the number of bytes transferred in that case is small, it still involves a non-negligible delay to retrieve the "Not Modified" message. Also, these requests load the network, cache and servers.

Many caches today use the concept of "gracing" to determine whether an object should be retrieved from its own cache or directly from the server. A gracing period is associated with Web objects that defines a period of staleness that is assumed that accessing clients are willing to tolerate. Thus, if an object is received by a cache at time $t_1$, a subsequent request for that object at up to time $t_1 + \Delta t$ will be retrieved from the cache rather than from the server. The gracing time $\Delta t$ will vary depending upon the type of object being retrieved. Inasmuch as certain objects are likely to be updated relatively frequently, such as the New York Times, and caches have no idea when the pages are updated, the gracing period needs to be very small if it is assumed that accessing clients want to read only that which is most current. As in the other prior art method, delays in filling requests and wasteful use of resources are inherent.

SUMMARY OF THE INVENTION

In accordance with the present invention, information about changes to a Web object in a server are provided to a cache, distinct from providing the Web object itself. Such information about an object is provided by a server in response to a cache request, asynchronous to a request from any client for the object. Further, such information about changes is meant to include information about an object that has been newly created in a server as well as an object that has been modified. In addition to the date and time when the object was last modified, such information about an object typically may also include, for example, the type of content of an object, and the byte size of an object, the latter being useful to the cache for planning disk space usage.

The mechanism of providing information to the cache about changes to an object in a server may be initiated in a first mode by the cache requesting the server to inform it about all or a subset of objects that have changed since a given date and time, or in a second mode by a server informing the cache on a periodic basis about changes to objects that the cache has previously indicated an interest in. The latter requires a registration phase during which the cache provides to the server the range of objects that interest it as well as the mode in which it wants to be updated. After the registration phase, therefore, information is provided to the cache in either the first mode, i.e., periodically sending information updates on all changed objects specified in the registration phase, or in the second mode, i.e., event driven wherein an update is sent whenever the object changes. During this second phase, both modes can co-exist.

Sending information notification messages rather than the contents of the object itself has several advantages over the prior art methodologies. Firstly, it enables cache coherency even if the cache may not have space left on its system to copy the Web object itself. Secondly, a logical separation is provided between information regarding the modification time of an object and the content of the object itself. The cache can therefore choose what objects it wants to refresh or cache, before it actually downloads them. Specifically, if the cache is notified of changes at intervals that are less than half the cache's gracing period for those objects, it does not have to access the server again to determine if the object is fresh if it has the object cached. Precious access time from the user's perspective is thus saved, which can be significant over links with large transfer delays.

Following the exchange of information between the server and the cache, the new or modified Web objects are be retrieved individually or as a batch using multipart messages, Keep-Alive connections, compression techniques, or any other scheme.

DETAILED DESCRIPTION

Figure 1:
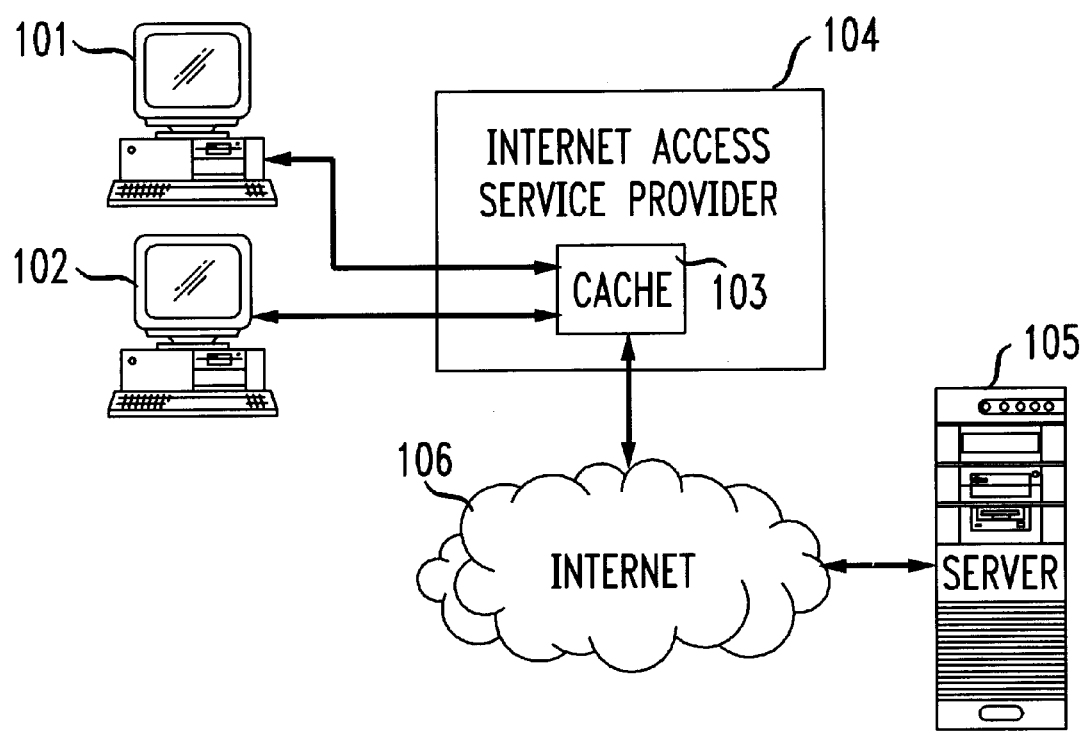
FIG. 1 is a block diagram of a prior art network showing a cache connected within an Internet Access Service Provider, interconnecting a client terminal and a server within the Internet.
Figure 2:
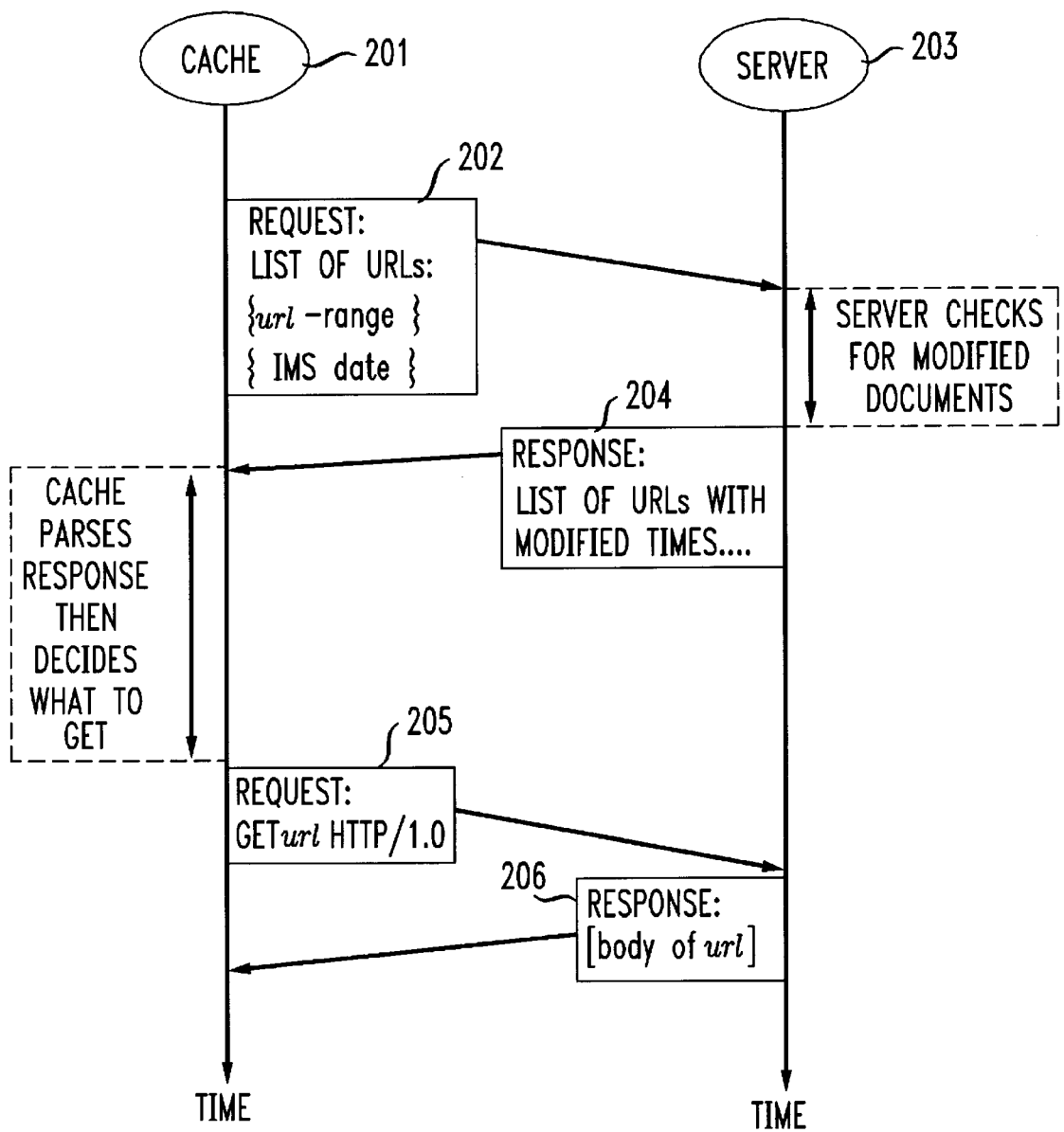
FIG. 2 shows the interactions between a cache and a server along a time-line in accordance with a cache-initiated notification mechanism of the present invention.

With reference to FIG. 2, a mechanism for a cache-initiated notification is shown. This mode is a Request-Response style mechanism, where information on contents is sent by the server to the cache in response to a request made by the cache. Thus, as shown in FIG. 2, the cache 201 initiates a request 202 to the server 203, which request may include an address list of URLs for which it desires information about changes. This list may include objects with individual URLs, or a plurality of objects within a range of URLs using a wildcard symbol to represent all those objects whose URLs share address commonality. As previously noted, "changes" is intended to mean both modifications to existing objects stored in a server as well as creation of new objects in the server. As can be noted in FIG. 2, the request 202 includes an "if modified since" (IMS) date, thereby indicating that information about changes to such listed URLs is requested only if the URL has been changed since that IMS date.

In response to that request 202, the server 203 checks those listed URLs to determine whether they in fact have been changed since the IMS date. The response 204 thereto is a list of those URLs that in fact have been changed since the specified IMS date, together with the times at which those URLs were changed. This information may also include the size of the requested URL object, as well as other information about the object, such as the type of content of the object. The cache 201 then parses the response and decides, using the retrieved information about those requested URLs, specifically which URLs it desires to then download. Based on its own set of rules, the cache decides to download a copy of an object based on the time at which it was last changed, the size of the object relative to the amount of free disk storage the cache has available, the contents of an object, and/or a combination of any of these pieces of information provided by the server, in addition to any other information that the cache may have available, such as a history of requests for the object by client terminals. Thus, for example, if the cache decides to retrieve the object with URL url, it makes a request 205 to GET the object with URL url using the HyperText Transfer Protocol (HTTP), which is the predominant World Wide Web Internet protocol. The server 203, in reply to that GET request, sends a response back to cache 201 that includes a copy of the body of the object with URL url. The cache 202 sequentially then makes a request to the server to GET a copy of each changed object it wants downloaded to it. As can be noted, this mechanism it totally independent of requests by a client terminal for the object.

Figure 3:
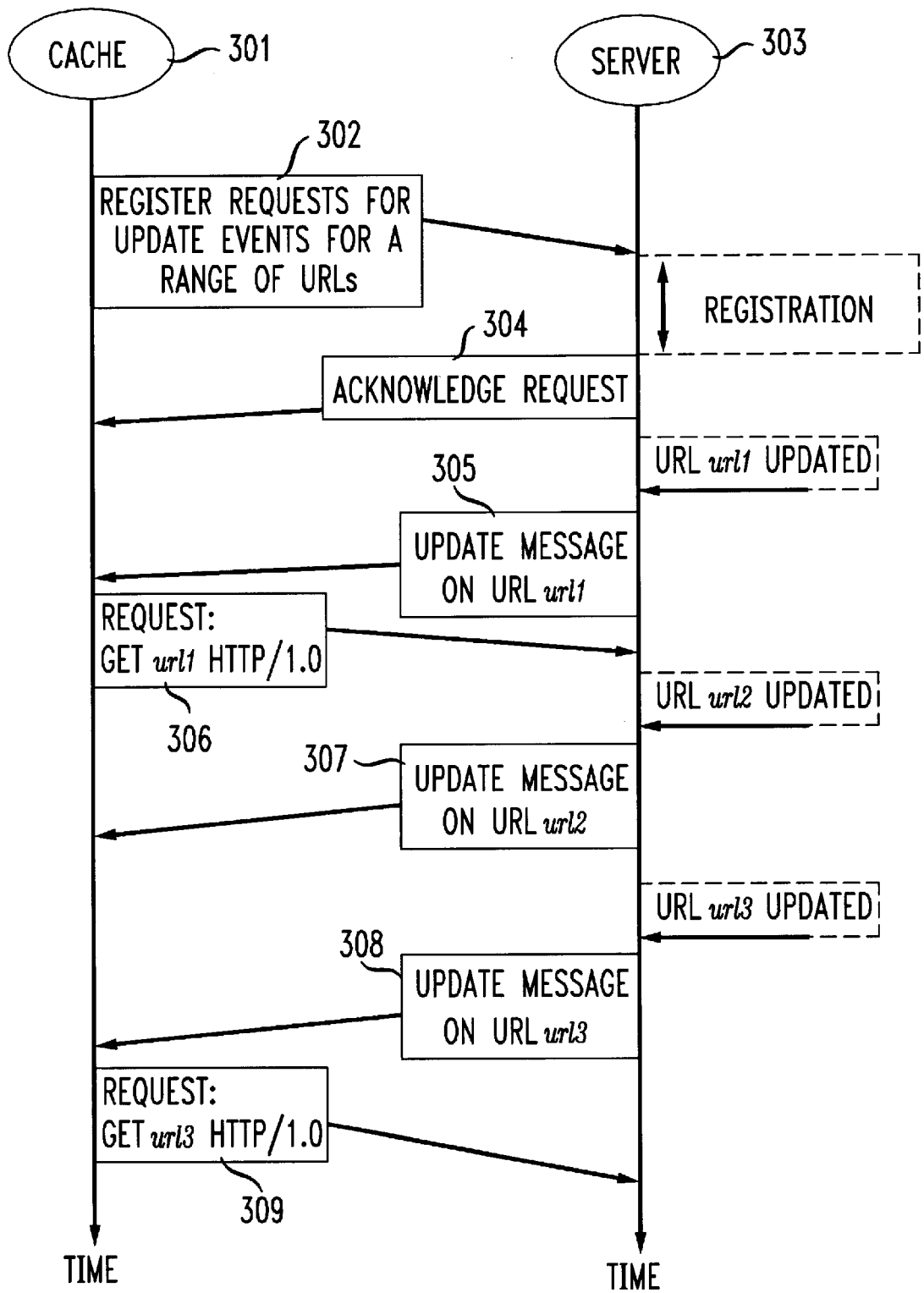
FIG. 3 shows the interactions between a cache and a server along a time-line in accordance with a server-initiated notification mechanism of the present invention.

The mechanism for a server-initiated notification scheme is shown in FIG. 3. This second mode is useful when the cache is interested in changes to specific objects, and wants the server to automatically send information on changes to those objects, either whenever they change or on a periodic basis. In this mode the cache 301 first registers a request 302 with server 303 for update events for a range of URLs. The server 303 then registers those requests and transmits an acknowledgment 304 back to cache 301. After registration, server 303 transmits an update message back to cache 301 whenever one of those registered URLs is changed. Thus, when URL url1 is changed, a message 305 containing information about the object is transmitted to the cache 301. In response thereto, the cache may decide to make a request 306 to GET url1 using the HTTP/1.0 protocol. Alternatively, in response to an information message that a particular URL has been changed, the cache may decide not to download it. Thus, as noted in FIG. 3, when URL url2 is changed and an update message 307 on URL url2 is transmitted to cache 301, the cache decides not to make a request to download the modified url2. In a similar manner, when URL url3 is changed and a message transmitted to the cache, the cache makes a request to download the modified object.

After the registration period in which the cache specifies to the server those objects for which it desires information, such information about those objects can be transmitted to the cache upon a change to the object, as described above, or on a periodic basis, or a combination of both.

The above-described server-initiated mechanism will reduce the traffic due to queries being made to caches about content changes in the server. For example, if the New York Times alters its content five times a day at instants generally not known in advance to the cache, it will send five update messages to those caches that have registered with it. Assuming caches want to maintain a coherency lag of no greater than six minutes, absence of a server-initiated mechanism could mean that 240 queries are made to the server by each cache. Furthermore, if notifications are initiated by the server, they can be multicast in a loose synchronous fashion at the network or application layers as well.

The cache-initiated and the server-initiated mechanisms described above can be implemented in a real network in various ways. One possible implementation of these mechanisms extends the HTTP protocol by defining a new request method called CONTENTS. Alternate designs may use a separate protocol suite, outside of HTTP.

Figure 4:
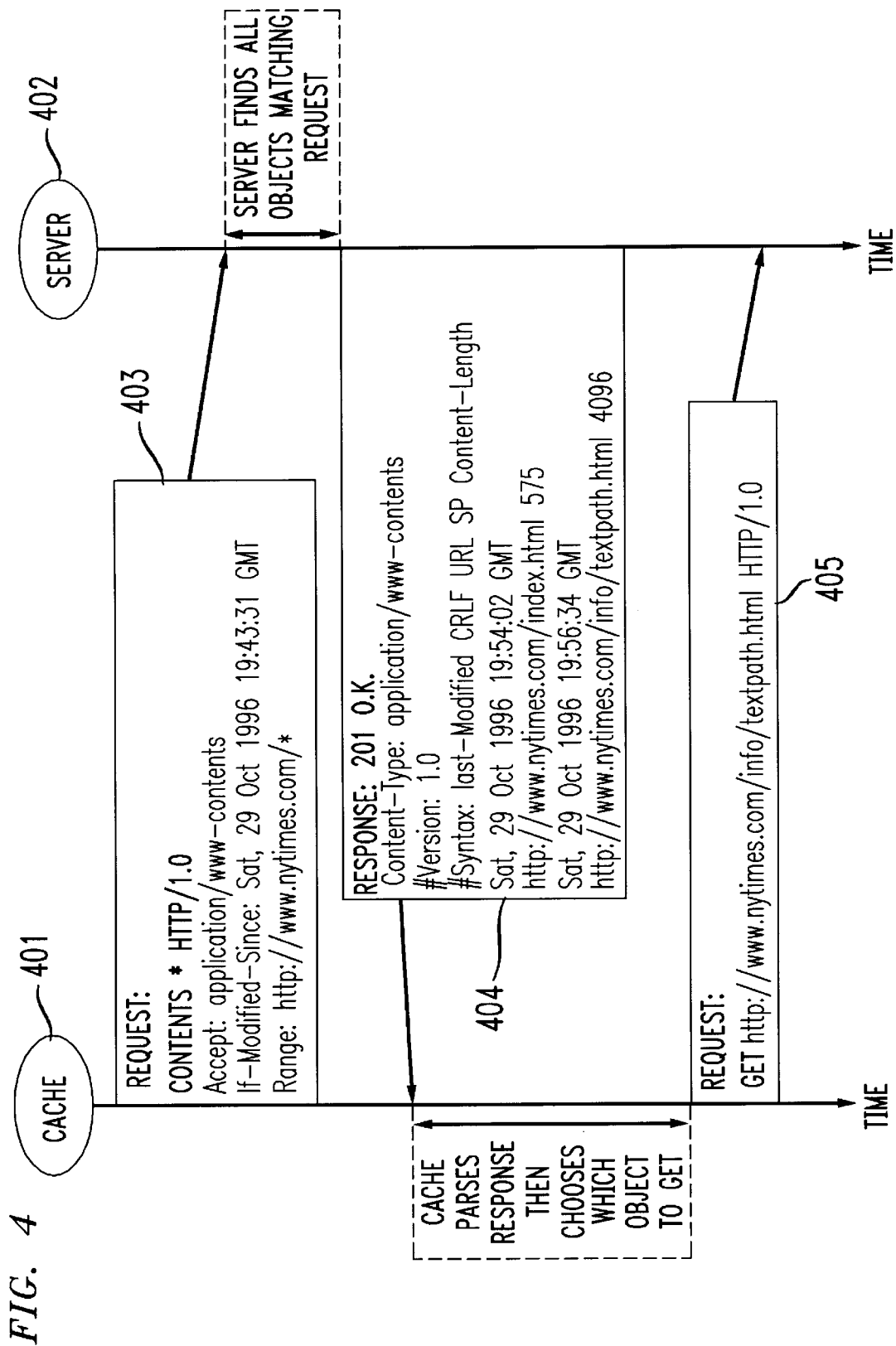
FIG. 4 shows the message interaction between a cache and a server for a specific implementation of the present invention.

FIG. 4 illustrates this protocol mechanism for a cache-initiated notification mode between a cache 401 and a server 402, which is illustratively shown as being the New York Times having a Web address of www.nytimes.com. In the Request made to the server for information about specific URLs, the HTTP/1.0 and HTTP/1.1 syntax for the Request-Line is:

> Request-Line=Method SP (space) Request-URL SP HTTP-Version CRLF (Carriage Return Line Feed)

and the syntax for the Request-URL is:

> Request-URL="*" |absoluteURL|abs-path

This does not permit expressing complete set of URLs. "*" is therefore chosen as the Request-URL, which fortuitously means that by default the request pertains to all of the contents of the server or serving cache. The Request-Line is thus:

> Request-Line="CONTENTS" SP "*" SP HTTP-Version CRLF

The If-Modified-Since field in the request header is used to specify that only those content changes that took place after the date specified by the If-Modified-Since field are of interest. The Range field is used to specify the URLs that are of interest. This is a field whose syntax has yet to be specified in the version 1.1 of the HTTP protocol, and it would be desirable if all regular expressions can be expressed by this field. If this should be insufficient, a new field may need to be created for this purpose. What is desired here is that if a cache is only interested in some select HTML pages, for example all the HTML pages of the New York Times except those from the Sports Section, and the JPEG images of the Louvre, it should be able to specify that union using the Range field. Finally, the Unless field is used to specify any other restriction the cache many want to apply on the URLs that interest it. A new application type termed application/www-contents is also defined to support the response that the server or serving cache returns.

In FIG. 4, in request 403, the request line is:

> CONTENTS*HTTP/1.0 wherein CONTENTS is the method requesting is a list of URLs, the "*" means that the method is controlled by protocol, and that HTTP/1.0 is that protocol. This line is followed by a CRLF. The next line is:

> Accept: application/www-contents which means that if the server sends the cache a response in accordance with that defined application, the cache will be able to understand it. The next line is:

> If-Modified-Since: Sat, Oct. 29, 1996 19:43:31 GMT which means that only URLs that have changed since Saturday, Oct. 29, 1996 at 19:43:31 GMT are of interest. The last line is:

> Range: http://www.nytimes.com/*

This defines the range of URLs which are of interest, with "*" indicating that all "www.nytimes.com" objects are of interest.

The response of the server to the cache also needs to follow a specific format. Instead of defining this within the protocol, it is left to the server to specify the format, although the format definition itself needs to have a specific syntax. The format of the file sent in response to the request contains a sequence of lines containing ASCII characters terminated by either the sequence LF (line feed) or CRLF. Each line may contain either a directive or a part of a entry. Entries consist of a sequence of fields relating to a single HTTP object. If a field is unused in a particular entry, "–" marks the omitted field. Directives provide information about the version, as well as header fields of the objects that follow. Lines beginning with the # character contain directives. The following directives are defined:

Version:<integer>.<integer>

The version of the extended log file format used.

Syntax: [<specifier> . . . ]

Specifies the fields recorded in the log. The strings SP and CRLF have special meaning.

Remark: <text>

Comment information. Data recorded in this field should be ignored by analysis tools.

The directives Version and Syntax are required. The Syntax directive may appear multiple times, with the understanding that all entries obey the Syntax directive that is above and closest to them. The Syntax directive specifies the data recorded in the fields of each entry.

In the response message 404, the line "201 O.K." indicates that the request was understood and that a valid response follows. Content-Type on the next line indicates that the a special document with a certain syntax follows that is not just textual in nature. The directive #Version defines the type of syntax, specifically version 1.0. The directive #Syntax: Last-Modified CRLF URL SP Content-Length indicates that what follows will have the format of the last modified date, on a next line, the URL that has been modified, followed by a space and the size of the object in bytes. Thus the response 404 indicates that two objects matched the request 403. The first object has URL http://www.nytimes.com/index.html, having been last modified on Saturday, Oct. 29, 1996 at 19:54:02 GMT, and having a length of 575 bytes. The second object has a URL of hftp://www.nytimes.com/info/textpath.html having been last modified on Saturday, Oct. 29, 1996 at 19:56:34 GMT, and having a length of 4096 bytes.

Cache 401, receives response 404 and chooses which objects to download from server 402 by means of a GET request. Thus, as noted in FIG. 4, cache 401 issues a request 405 to GET http://www.nytimes.com/info/textpath.html HTTP/1.0, from server 402. Server 402 subsequently fills that request by forwarding the body of that object back to cache 401, where it replaces the stale version of the object in the cache.

The above-described embodiments are illustrative of the principles of the present invention. Other embodiments may be devised by those skilled in the art without departing from the spirit and scope of the present invention.

The invention claimed is:

1. In a data network including a cache and a server, a method comprising the steps of:

receiving a request at the server from the cache for information to be kept informed about changes made by said server to the contents of an object in the server; and providing the requested information to the cache about a change to the contents of the object in the server, whenever a change occurs in the contents of the object in the server, or at the end of each periodic interval if a change occurs in the contents of the object during said interval, as specified by said cache until directed to stop.

2. The method of claim 1 further comprising the steps of:

receiving a request at the server from the cache for a copy of the object; and providing a copy of the object in the server to the cache in response to the request for a copy of the object from the cache.

3. The method of claim 1 wherein the request for information about a change to the contents of an object is received asynchronous with a request for a copy of the object by a client terminal connected to the cache.

4. The method of claim 1 wherein the step of receiving a request at the server from the cache for information about a change to the contents of an object comprises the step of the server receiving from the cache a registration request for information about a change to the contents of the object, and the server provides to the cache the information about a change to the contents of the object whenever a change to the contents of the object takes place in the server.

5. The method of claim 1 wherein the step of receiving a request from the cache for information about a change to the contents of the object comprises the step of receiving a request to determine whether the contents of the object have been modified since a specified previous time.

6. The method of claim 5 wherein the information about a change to the contents of the object comprises information relating to when the contents of the object changed in the server.

7. The method of claim 6 wherein the information about a change to the contents of the object further comprises the size of the object in the server.

8. In a data network including a cache and a server, and a terminal coupled to the cache, a method, carried out in said cache, comprising the steps of:

making a request to the server for information, to be delivered pursuant to a schedule specified by said cache, about a change to the contents of an object in the server that have been previously stored in said cache in response to one or more requests from said terminal to read said object;

receiving at the cache from the server the requested information about the change to the contents of the object in the server;

parsing said information to determine whether said contents of said object need to be requested from said server;

sending a request for said contents of said object when said step of parsing determines that said contents need to be requested;

receiving said contents of said object and storing said contents in said cache; and supplying said terminal with a requested object from said cache, when the requested object is found in said cache, and sending a request for contents of said requested object to the server when said requested object is not found in said cache.

9. The method of claim 8 wherein the request for information about a change to the contents of the object is made asynchronous with a request for a copy of the object by a client terminal connected to the cache.

10. The method of claim 8 wherein the request to the server for information about a change includes a request to continually send said information about a change in the contents of said object in said server whenever such a change occurs.

11. The method of claim 8 wherein the request to the server for information about a change includes a request to send said information about a change in the contents of said object in said server at the end of each periodic interval, when such a change occurs during the interval.

12. The method of claim 8 wherein the step of making a request to the server from the cache for information about a change to the contents of the object comprises the step of making a registration request for information about a change to the contents of the object, and the cache receives from the server the information about a change to the contents of the object whenever a change to the contents of the object takes place in the server.

13. The method of claim 8 wherein the step of making a request to the server for information about a change to the contents of the object comprises the step of determining whether the contents of the object have been modified since a specified previous time.

14. The method of claim 13 wherein the information about a change to the contents of the object comprises information relating to when the contents of the object changed in the server.

15. The method of claim 14 wherein the information about a change to the contents of the object further comprises the size of the object in the server.

* * * * *

UNITED STATES PATENT AND TRADEMARK OFFICE
CERTIFICATE OF CORRECTION

PATENT NO.  : 6,138,141
DATED       : October 24, 2000
INVENTOR(S) : Antonio DeSimone, Sandeep Sibal It is certified that error appears in the above-identified patent and that said Letters Patent is hereby corrected as shown below:

The notice on the title page of the patent, which states:

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

Is rescinded, and is of no effect. The notice on the title page of the patent, which states:

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

Is rescinded, and is of no effect.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,138,141
DATED : October 24, 2000
INVENTOR(S) : Antonio DeSimone, Sandeep Sibal It is certified that error appears in the above-identified patent and that said Letters Patent is hereby corrected as shown below:

The notice on the title page of the patent, which states:

[*] Notice:   This patent issued on a continued prosecution application filed under 37 CFR 1.53(d), and is subject to the twenty year patent term provisions of 35 U.S.C. 154(a)(2).

This patent is subject to a terminal disclaimer.

Is rescinded, and is of no effect.

Signed and Sealed this

Twenty-sixth Day of June, 2001

*Attest:*

NICHOLAS P. GODICI
*Attesting Officer*   *Acting Director of the United States Patent and Trademark Office*